Aug. 22, 1961    W. B. ABBOTT ET AL    2,997,159
TYPOGRAPHICAL COMPOSING MACHINES
Filed Oct. 20, 1959    6 Sheets-Sheet 1

Fig. 1.

INVENTORS
WILLIAM B. ABBOTT
WILLIAM A. MILANESE, JR.
BY
Morrin, Kennedy Campbell
ATTORNEYS Aug. 22, 1961 W. B. ABBOTT ET AL 2,997,159
TYPOGRAPHICAL COMPOSING MACHINES
Filed Oct. 20, 1959 6 Sheets-Sheet 4

INVENTORS
WILLIAM B. ABBOTT
WILLIAM A. MILANESE, JR.
BY
ATTORNEYS

2,997,159
TYPOGRAPHICAL COMPOSING MACHINES

William B. Abbott, Baldwin, and William A. Milanese, Jr., Huntington, N.Y., assignors to Mergenthaler Linotype Company, a corporation of New York
Filed Oct. 20, 1959, Ser. No. 847,619
30 Claims. (Cl. 199—26)

This invention relates to typographical composing machines of the general organization wherein circulating matrices are released from a magazine in the order in which their characters are to appear in print, the matrices assembled in line together with spacebands, the composed line delivered to a first elevator which presents it to the face of a slotted mold wherein a typographical slug is cast, and the matrices and spacebands thereafter separated and returned to their places of storage. More particularly, the invention relates to a so-called "straight line" delivery mechanism for such a machine wherein the assembler, in which the lines of matrices and spacebands are composed, is a stationary member mounted at line delivery level. With such an arrangement, a line is both composed and delivered to the first elevator at one and the same level in the machine.

Conventionally, matrices are delivered for composition to a vertically movable assembling elevator located at a matrix receiving level in the machine. Upon completion of the line, the elevator is raised to a line delivery level, whereupon the depending fingers of a line delivery carriage engage the line and transfer it horizontally to the first elevator. It is clear that, until the assembling elevator returns to its matrix receiving position from the line transfer position, further delivery of matrices and spacebands must be suspended, with the result that a time delay occurs between the assembling of successive typographical lines. This time delay, of course, affects the overall speed of operation of the machine, thus making it desirable to reduce the interval between the completion of one line and the commencement of a succeeding line as much as possible. It is toward just such a goal that the present invention is aimed.

Although a number of straight line delivery mechanisms have been suggested in the past, none of them offer the advantage of continuous composition, i.e. delivery into the assembler in rapid succession of the last matrix of one line and the first matrix of the following line. Furthermore, an obstacle which presents itself in the design of any straight line delivery mechanism is the provision for a waiting line position. As is well known, composition of a line is often completed before the casting cycle of the previous line has terminated. In this situation, the completed line may not be delivered to the first elevator, yet if it remains in the assembler, further composition is interfered with. For this reason, the line delivery device is ordinarily adapted to move the line from the assembler to a waiting position, located along its path of travel intermediate the assembler and the first elevator, where the line remains until the casting cycle is over. Previous straight line delivery mechanisms have overcome the waiting line problem by providing a resistant for supporting the leading end of a line as it is composed in the assembler, and in addition, a pair of line delivery members which are normally disposed outside the assembler. Upon completion of the line, the delivery members are inserted into the assembler, one in front of and one behind the line, to thereby confine the line preparatory to its transfer to the first elevator. Before the transfer can take place, however, the resistant is shifted out of the assembler so as not to obstruct the removal of the line from the assembler. The resistant must then be moved from its position adjacent the leading end of the completed line back to the receiving end of the assembler adjacent the star wheel before composition of a subsequent line can begin. A time lag therefore results between the completion of one line and commencement of the following line.

It is the object of the present invention to eliminate the undesirable time delay described above and, toward this end, the present invention discloses a straight line delivery mechanism which allows substantially continuous assembling of successive lines of matrices and spacebands. Briefly, the present invention accomplishes this result by employing a resistant which not only supports the leading end of a line during composition, but which also cooperates with a line delivery member to transfer the line to the first elevator. In addition, an auxiliary resistant is employed to support the leading end of a succeeding line while the main resistant is occupied with the delivery of the prior line. By utilizing an auxiliary resistant, therefore, composition of the succeeding line may begin at almost the same instant as the prior line is completed.

It will be recognized that the present invention is of particular significance in connection with modern high speed machines operated by automatic control units.

The invention will now be more fully described with reference to the accompanying drawings.

Referring to the drawings.

Figure 1:
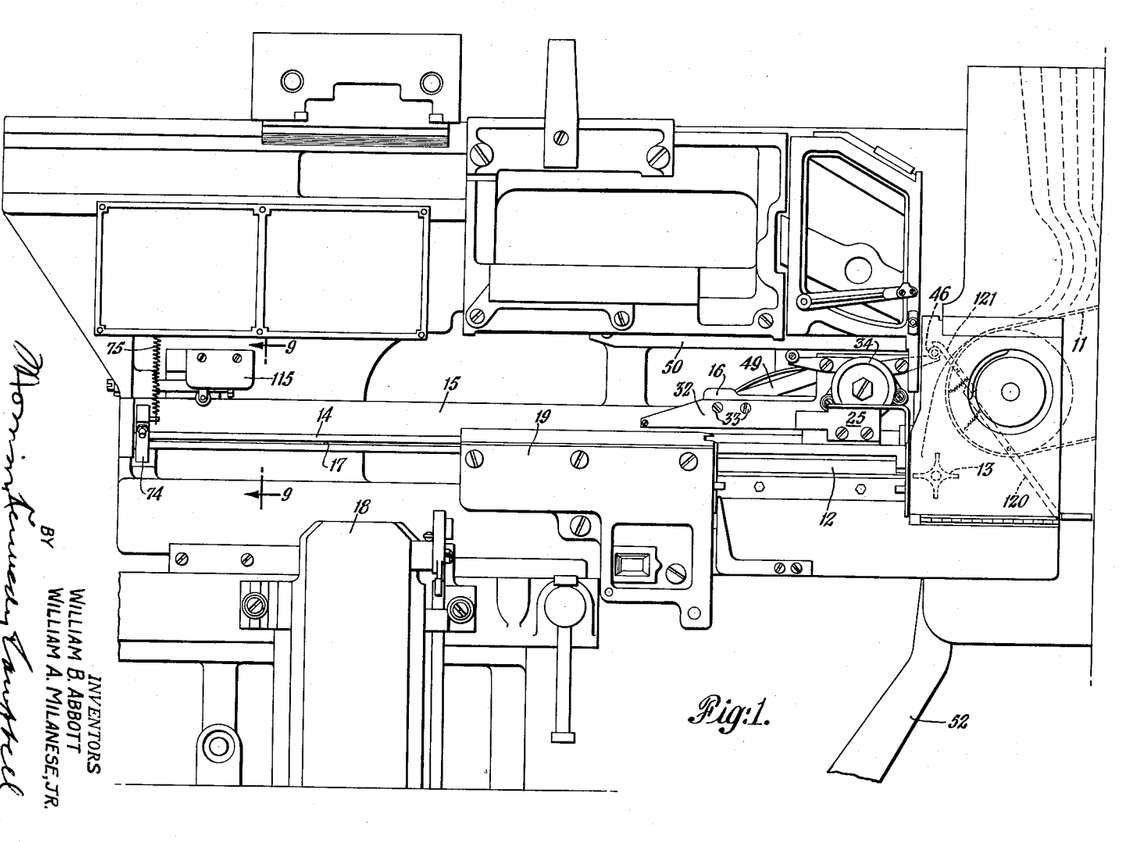
FIG. 1 is a partial front elevational view of a typographical composing machine equipped with the present invention.

As usual, character bearing matrices are released from their respective storage magazines in response to the operation of a keyboard (magazines and keyboard not being shown), thence fall on to a continuously moving delivery belt 11, and are composed in line in an assembler 12 by a stacking device in the form of a constantly rotating star wheel 13. The assembler 12 of the present invention differs from the conventional assembling elevator in that the present assembler is not movable vertically from a lower assembling position to an upper line delivery position but rather is fixed in line delivery position. Hence, a line composed in the assembler 12 remains at the level at which it is composed during its delivery to the first elevator 18. In FIG. 1, the first elevator is shown in its lowermost or casting position but during line transfer it will occupy its normal line receiving position in registration with the intermediate channel 19, that is to say, in horizontal alignment with the assembler 12.

Figure 2:
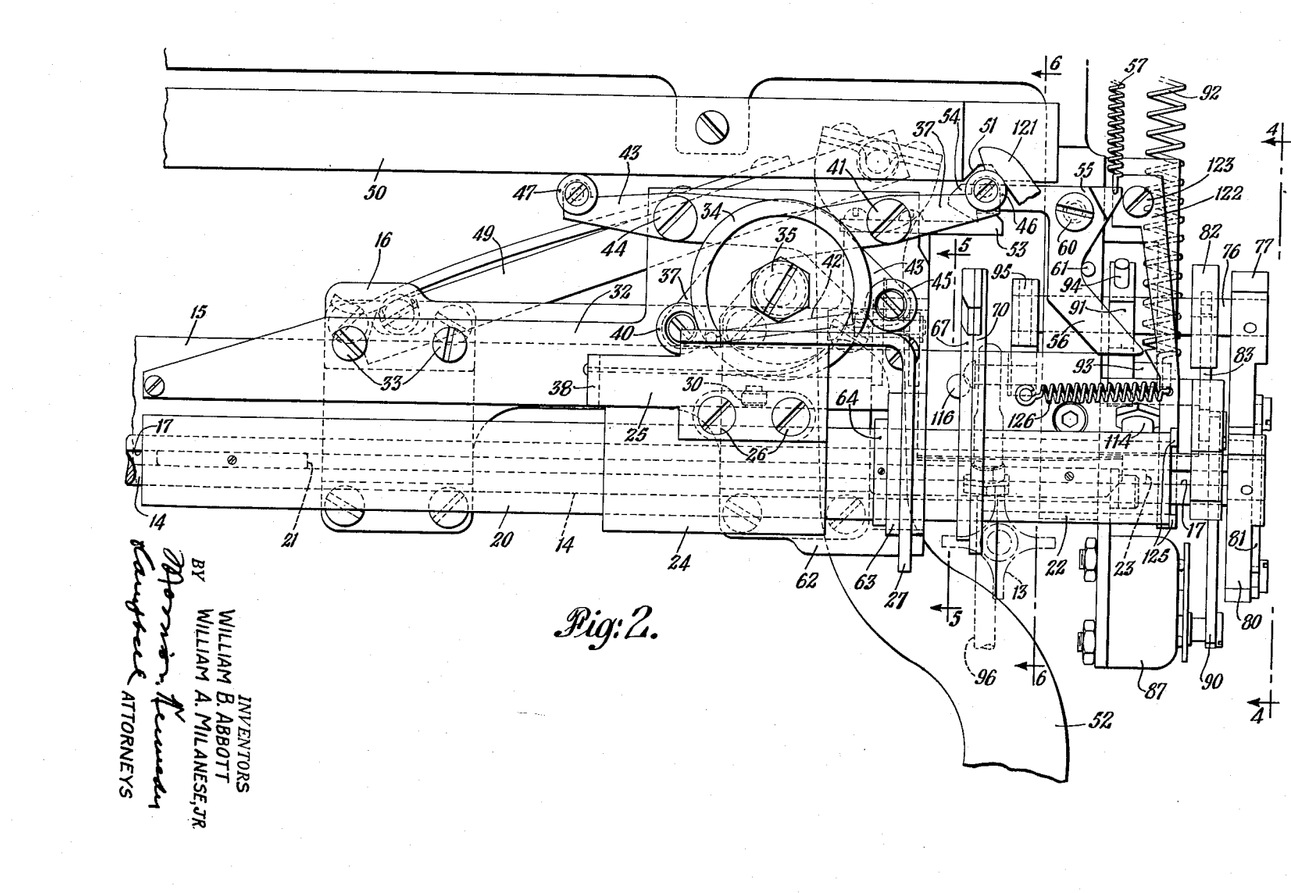
FIG. 2 is an enlarged front elevational view of the present straight line delivery mechanism.
Figure 3:
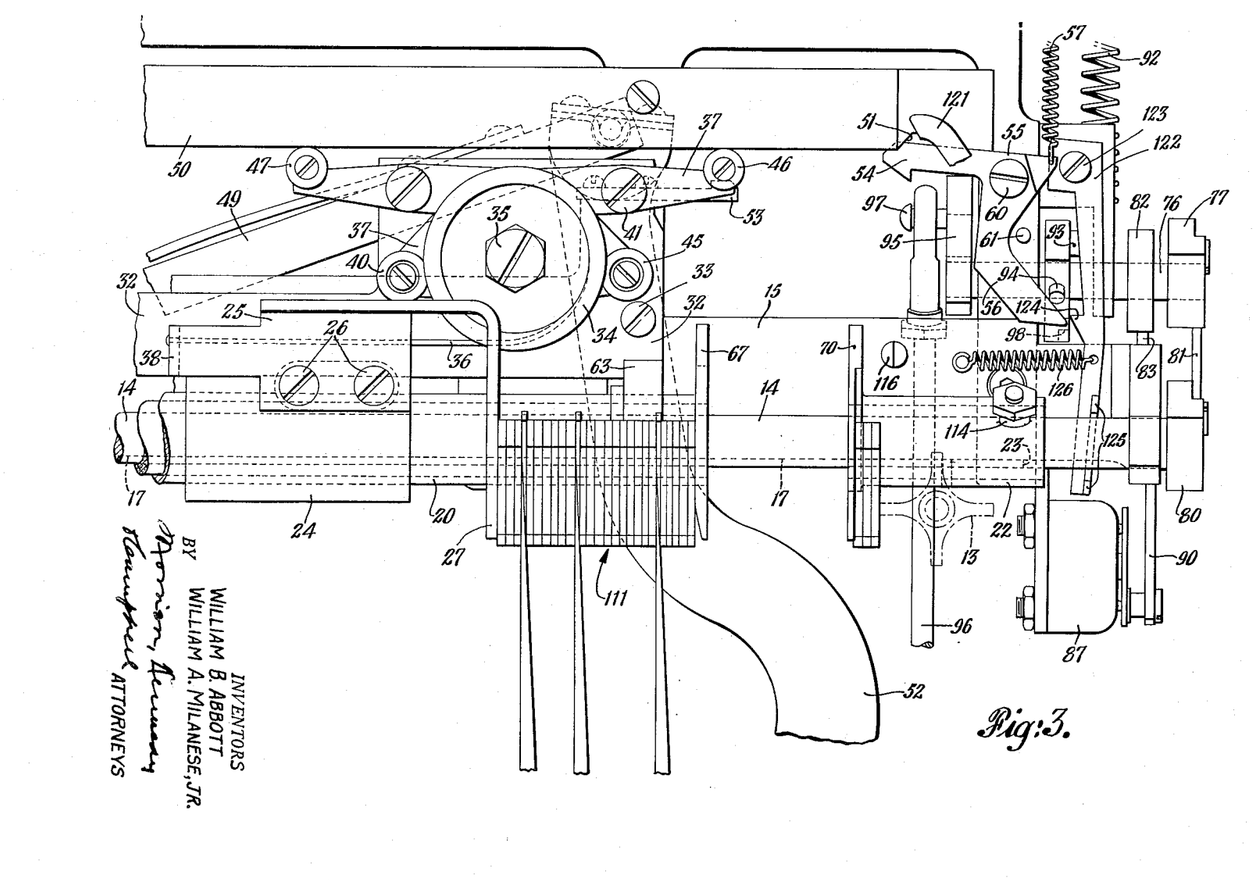
FIG. 3 is similar to FIG. 2 showing the elements of the present mechanism in different positions.
Figures 4, 5:
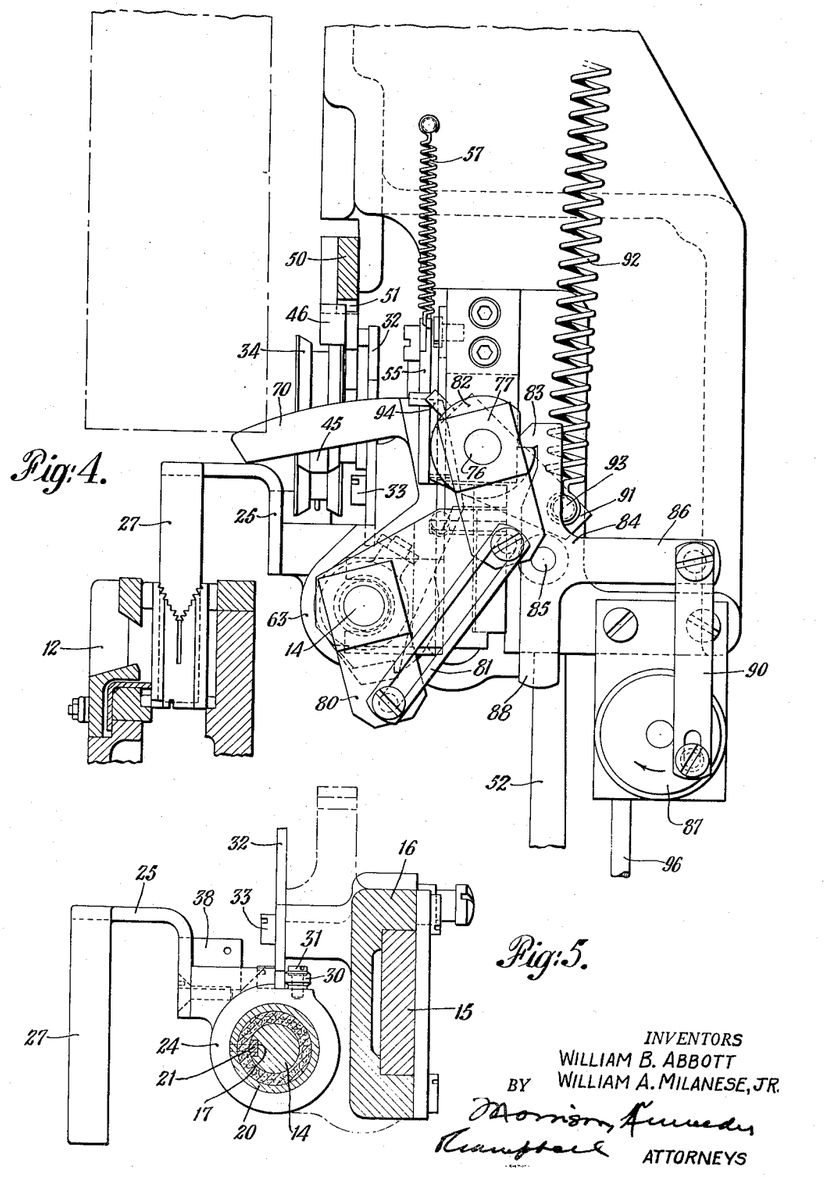
FIG. 4 is a view taken on line 4—4 of FIG. 2.
FIG. 5 is a view taken on line 5—5 of FIG. 2.

Referring to FIGS. 1 to 6, a horizontally disposed rock shaft 14, which runs the entire length of the line delivery stroke, is journalled in the machine frame about midway between the assembler 12 and the delivery slide rail 15 (see FIGS. 4 and 5). A line delivery slide 16 is slidably supported for hoizontal movement upon the rail 15. The rock shaft 14 is provided with a keyway 17 along its entire length. A long sleeve 20, having a key 21 which fits into the keyway 17, surrounds a section of the shaft 14, and a short sleeve 22 having a key 23 which is also accommodated by the keyway 17 surrounds another section of the shaft 14. Both sleeves 20 and 22, by virtue of their key connections to the shaft 14, are forced to rotate with the shaft when the later is rocked, and yet are slidable horizontally with respect to the shaft.

An enlarged sleeve 24 surrounds a section of the long sleeve 20 but is unconnected thereto, whereby the sleeve 24 is slidable along the sleeve 20, while the sleeve 20 is free to rotate inside the sleeve 24 without disturbing the latter. A bracket 25 is attached to the enlarged sleeve 24 by means of screws 26, and the main resistant 27 of the present mechanism is integral with the bracket 25, the resistant 27 depending vertically from the bracket into the assembler 12. The resistant 27 and bracket 25 naturally have a tendency to rotate the sleeve 24 about the sleeve 20, but such rotation is prevented, as may be seen in FIG. 5, by a roller 30 mounted on the sleeve 24 by a journal stud 31, which roller bears against the rear face of a long plate 32. The plate 32 is itself secured to the line delivery slide 16 by screws 33. It may be seen, therefore, that the resistant 27, which serves to support the leading or left-hand matrix of each line composed in the assembler, is adapted to be moved leftwardly gradually by each line as the latter grows in length, whereby the enlarged sleeve 24 upon which the resistant is mounted slides leftwardly upon the long sleeve 20, and the roller 30 moves along a line parallel to the lower edge of the plate 32.

Disposed above the sleeve 24 is a spring tensioned reel 34 rotatably mounted on the plate 32 by means of a journal stud 35. A length of flexible cord 36 is wound on the reel, and the free end of the cord is fastened to a plate 38 integral with the bracket 25 which is fixed to the sleeve 24 (FIG. 5). As the resistant 27 is forced leftwardly by the line of matrices being composed in the assembler 12, the cord 36 is drawn from the reel 34, thus rotating the reel and tensioning the spring therewithin. This spring tension applied to the resistant enables the resistant to properly support the leading matrix of the line as it is composed. During composition of each line, the tendency of the spring tensioned reel 34 to pull the resistant 27 toward the matrix receiving end of the assembler is checked by a brake lever 37 carrying a brake shoe 40 at its lower end, which shoe contacts the inwardly sloping edges of the reel 34 and thus prevents its rotation by the tensioned spring. The brake lever 37 is pivotally mounted on the plate 32 by a screw stud 41, and a tension spring 42, fastened at one end to the brake lever 37, urges the brake shoe into contact with the reel 34. The other end of the spring 42 is fastened to another brake lever 43 pivotally mounted on the plate 32 by a screw stud 44, this second brake lever having a brake shoe 45 fixed to its lower end. The upper ends of the brake levers 37 and 43 are provided with follower rollers 46 and 47 respectively, which rollers engage the lower edge of a cam plate 50 fixed to the machine frame. As may be seen in FIG. 1, the cam plate 50 extends only a short distance toward the first elevator. While the line is being composed against the resistant 27, the roller 46 is disposed in a notch 51 cut in the cam plate 50 (FIG. 2), thus permitting the spring 42 to pull the brake shoe 40 into engagement with the reel 34. At the same time, the roller 47 contacts the lower edge of the cam plate 50 and thereby maintains the brake shoe 45 out of engagement with the reel 34. This is done because when the shoe 45 contacts the reel, it prevents rotation of the reel and the withdrawal of the cord therefrom, so that the resistant is prevented from moving toward the left.

It is sometimes desirable to break the engagement between the brake shoe 40 and the reel 34 while the delivery slide is in its rightwardmost position (as in FIG. 2) in order to permit the reel 34 to move the resistant 27 rightwardly. This is provided for by a pair of cooperating levers 120 and 121 (see FIG. 1) both of which are pivotally mounted on the swinging front 119 of the machine. The lower end of the lever 120 projects through the front 119 and is adapted to be depressed manually by the machine operator. The upper end of the lever 121 is disposed adjacent the roller 46 when the roller is at rest in the notch 51. When the lower end of the lever 120 is depressed, the upper end of the lever 120 engages the lower end of the lever 121 and rotates the latter in a counterclockwise direction. The lever 121, in turn, through contact with the roller 46, pivots the brake lever 37 about the stud 41 and thus disengages the brake shoe 40 from the reel 34. Further reference will be made to the tensioning reel and its associated brakes later on.

The delivery slide 16, supported on the rail 15, is pivotally connected to the usual delivery slide lever 52 by a link 49 (FIG. 8), which lever, as is well known, is spring biased to effect the delivery of a completed line from the assembler 12 to the first elevator 18. During composition of a line against the resistant 27, the lever 52 is prevented from moving the slide 16 toward the left due to the engagement of a latch holder 53, fixed to the slide 16, with a latch 54 which forms one arm of a bell crank 55 pivotally mounted on the machine frame (see FIGS. 2 and 8). The depending arm 56 of the bell crank is provided with a cam surface on its rightward edge, and a tension spring 57, fastened at one end to the bell crank 55 and at its other end to the machine frame, tends to rotate the bell crank about its pivot 60 in order to maintain the latching engagement between the latch 54 and the holder 53, this rotation being limited by a pin 61 which is engaged by the depending arm 56. The delivery slide 16 has integral therewith a cantilever member 62 (see FIG. 6) which terminates in a collar 63 loosely surrounding the long sleeve 20 near the right end of the latter. Another collar 64 is fixed to the long sleeve 20 adjacent the collar 63, whereby when the slide 16 is moved toward the first elevator by the lever 52, the collar 63 will abut the collar 64 and slide the long sleeve 20 along the shaft 14 toward the first elevator. The delivery slide 16, in addition, pivotally supports a right-angle latch member 65 (FIGS. 6 and 7) which is biased toward the front of the machine by a spring 66. The horizontal leg of the member 65 is bent backwardly near its free end for a purpose which will be described hereinafter.

The long sleeve 20 is provided with a line delivery finger 67 integral with the right-hand end of the sleeve. Disposed adjacent the finger 67, in FIG. 2, is an auxiliary line resistant 70 integral with the left-hand end of the short sleeve 22. The delivery finger 67 and auxiliary resistant 70 have similar contours except that the finger 67 has a lower arcuately shaped flange portion 71 formed with a lip 72 at its lowermost end, whereas the lower flange 73 of the auxiliary resistant has a squared-off bottom edge whose radial distance from the center of the shaft 14 is greater than the radius of the arcuate section 71. As may be seen in FIG. 6, the horizontal leg of the latch member 65 is normally biased into engagement with the arcuate section 71 of the finger 67 by a spring 66. The delivery finger 67 and the auxiliary resistant 70 are normally maintained out of the assembler during the composition of a line against the main resistant 27. This is accomplished by means of a lever 74 fastened to the rock shaft 14 near the left end of the latter (see FIGS. 1 and 9), which lever has one end of a tension spring 75 fastened thereto, the other end of the spring being fastened to the machine frame. The spring 75 tends to rotate the shaft 14 clockwise (as viewed in FIG. 9), thus holding the finger 67 and resistant 70 in the solid line position shown in FIG. 66.

Figure 6:
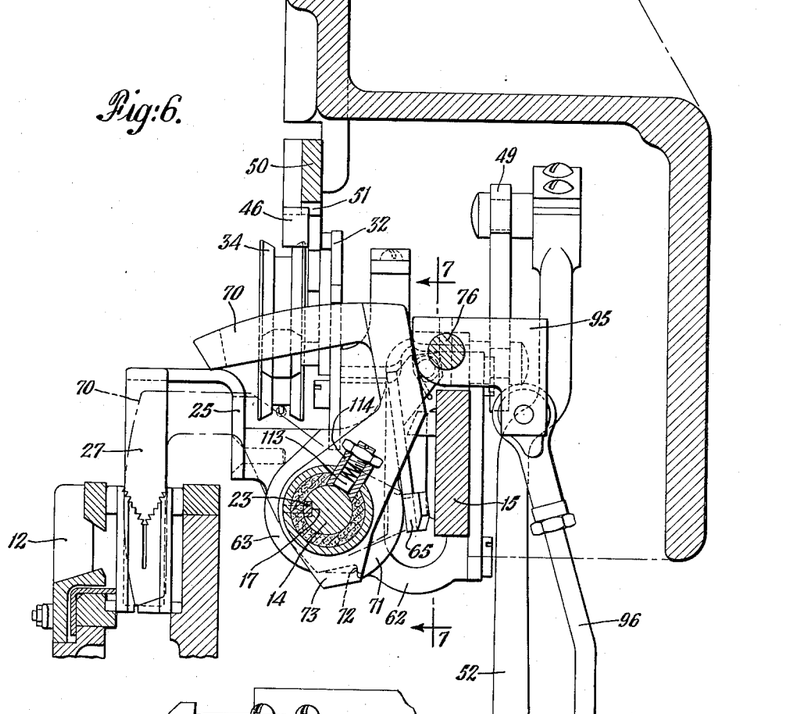
FIG. 6 is a view taken on line 6—6 of FIG. 2.
Figure 7:
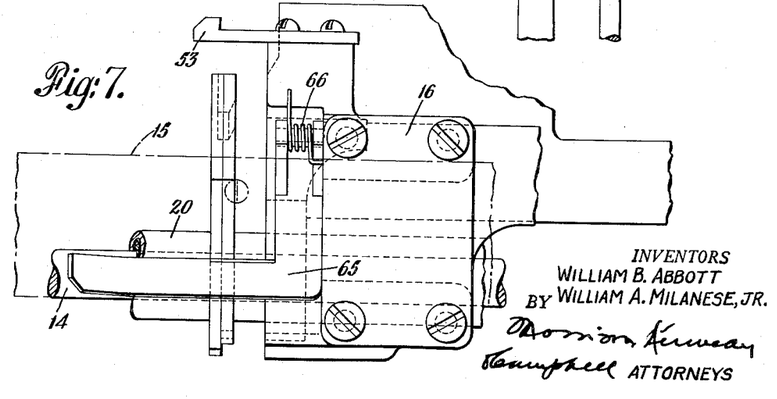
FIG. 7 is a partial rear elevational view of the line delivery slide taken on line 7—7 of FIG. 6.

When composition of a line has been completed in the assembler, the line delivery finger 67 and auxiliary resistant 70 are swung forwardly into the position shown in dot and dash lines in FIG. 6, and the line delivery slide 16 is released for transfer movement toward the first elevator. The means for automatically effecting these functions will now be described.

A short shaft 76, disposed parallel to the rock shaft 14, is rotatably mounted above and behind the shaft 14. As may be seen clearly in FIG. 4, the shaft 76 carries a lever 77 adjacent one end, which lever is pivotally connected by a slotted link 81 to a similar lever 80 fast to the adjacent end of the rock shaft 14. By such an arrangement, any counterclockwise rotation of the shaft 76 will be transmitted to the shaft 14, but clockwise rotation of the shaft 76 will not be so transmitted. The shaft 76 also has mounted thereon, near the lever 77, a latch plate 82 having a notch disposed in its periphery. The notch is normally engaged by a latch 83 which forms one-half the cross bar of a T-shaped member 84 pivotally mounted at 85 to the machine frame. The trunk 86 of the T-shaped member 84 is pivotally connected to a solenoid 87 by a link 90, whereby upon energization of the solenoid, the latch 83 and latch plate 82 will be disengaged. Note that the link 90 is slotted at its end connected to the solenoid 87. This is to permit the member 84 to be pivoted manually, to release the latch plate 82, when the solenoid is in deenergized condition. The means for manually actuating the member 84 may be seen in FIG. 10. A release lever 106, adapted to be depressed by a machine operator, is pivotally mounted on the machine frame by a screw stud 107 and is normally maintained in the position shown by a tension spring 108. A pin 109, projecting from the lever 106, normally contacts one edge of an arm 88, which forms, with the latch 83, the cross-bar of the T-shaped member 84. When the lever 106 is depressed, it pivots against the force of the spring 108, and the pin 109, abutting the arm 88, pivots the member 84 in clockwise direction, whereby the latch 83 releases the latch plate 82.

Figures 8, 9, 10:
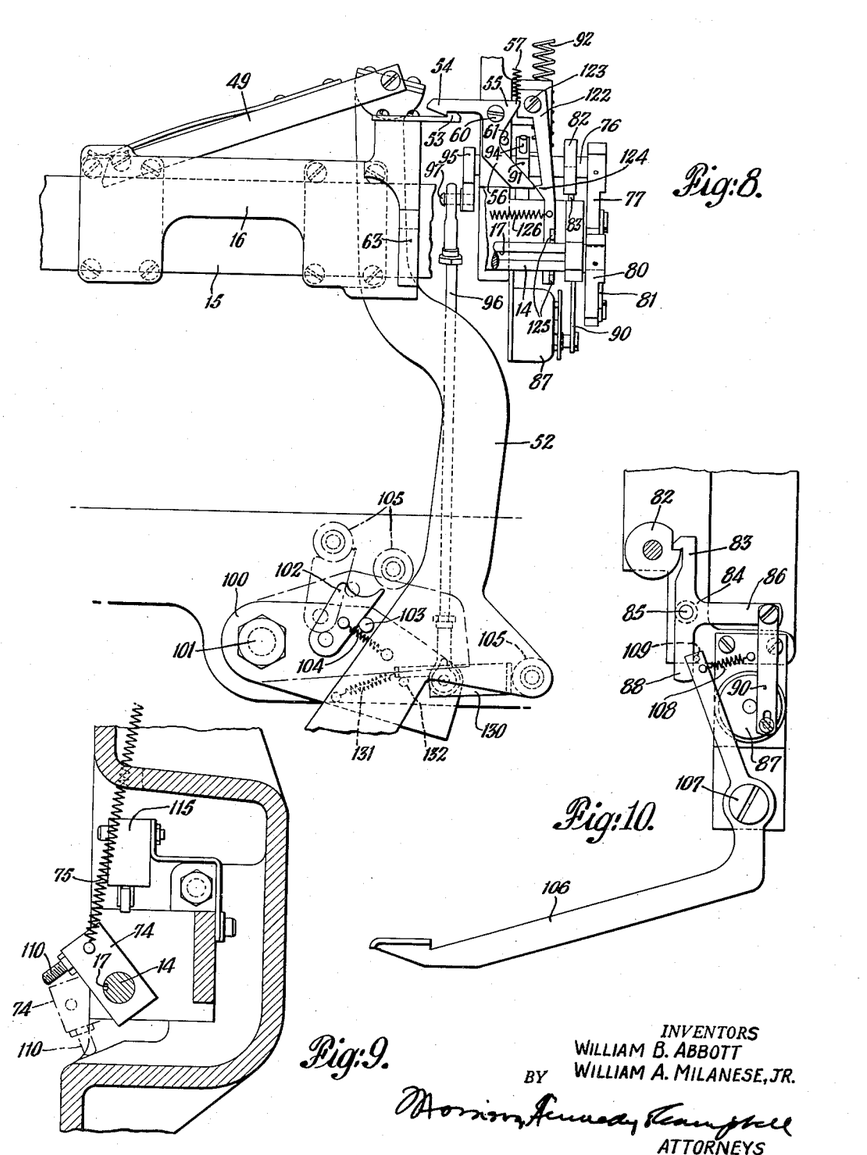
FIG. 8 is a front elevational view of the delivery slide lever and associated recocking mechanism.
FIG. 9 is a view taken on line 9—9 of FIG. 1.
FIG. 10 is a side elevational view of the manual delivery slide release mechanism.

A second lever 91, mounted on the shaft 76 intermediate the ends of the latter, has one end of a spring 92 fastened to a pin 93 projecting from one side of the lever, the other end of the spring being fixed to the machine frame. The spring 92 tends to rotate the shaft 76 and hence the shaft 14 in a counterclockwise direction (FIG. 4), which motion is resisted by the engagement of the latch 83 and the latch plate 82. The lever 91 has a second pin 94 projecting therefrom, which pin is normally disposed in such relation to the bell crank 55 that upon rotation of the shaft 76, the pin 94 contacts the cam surface edge of the depending arm 56 (FIG. 3). Finally, the shaft 76 carries a third lever 95 adjacent its other end. The upper end of a vertical rod 96 is pivotally connected to the lever 95 by means of a pin 97 projecting from the lever, and the lower end of the rod 96 (see FIG. 8) is pivotally connected to one end of a lever 100 which is itself pivotally mounted on the machine frame by a pin 101. The lever 100 has an arm 102 pivotally secured thereto and which is held in contact with a pin 103 projecting from the lever 100 by a tension spring 104 connected at its opposite ends to the arm 102 and the lever 100, respectively. The arm 102 is located in the path of travel of a roller 105 carried by the delivery lever 52, whereby the lever 52 will serve during its return stroke to contact the arm 102 and pivot the lever 100 in a clockwise direction for a purpose to be later described. The lever 100 also has a safety lever 130 pivotally mounted thereon at the same point where the rod 96 joins the lever 100. A tension spring 131 normally maintains one end of the lever 130 in contact with an abutment pin 132 projecting from the lever 100. The free end of the lever 130 is bent forwardly at right angles to the body of the lever so as to provide a face against which the roller 105 on the lever 52 can abut. When the short shaft 76 rotates and raises the lever 100 to its upper position, the safety lever 130 moves out of the path of the roller 105 and hence does not obstruct the movement of the lever 52. When the lever 52 returns rightwardly, the roller 105 pivots the lever 100 downwardly, as described above, and then snaps in behind the right angle portion of the lever 130 (as shown in FIG. 8). In this latter position, the lever 52 cannot be moved toward delivery position until the lever 100 is moved upwardly once again. This is important since occasionally, when the lever 52 is returning rightwardly, the link 49 slips off the delivery slide 16. Without the safety lever 130, the lever 52 would, in such a case, be returned to its rightward position and then, since the latch holder 53 is not present to be engaged by the latch 54, the lever 52 would immediately be returned toward the left, causing possible damage to the machine parts.

When a complete line of matrices and spacebands has been assembled against the resistant 27, and if the machine is being operated by a coded tape, an end-of-line signal in the tape will effect the energization of the solenoid 87, which thereupon rotates in the direction of the arrow in FIG. 4 and pivots the T-shaped member 84 about its pivot 85. If the machine is being manually operated, the release lever 106 (FIG. 10) is depressed to pivot the member 84 as described above. In the alternative, a push-button may be provided for energizing the solenoid 87 to pivot the member 84. When the member 84 pivots, the latch 83 releases the latch plate 82, thus permitting the spring 92 fast to the lever 91, to rock the short shaft 76 and through the link 81 to turn the rock shaft 14. The line delivery finger 67 and the auxiliary resistant 70 are thereby swung forwardly into the assembler 12 behind the completed line of matrices. It is apparent that, in order to accomplish this function, the spring 92 must be stronger than the spring 75 fastened to the lever 74. The rotation of the rock shaft 14 is limited by an adjustable stop 110 (see FIG. 9) projecting from the lever 74 mounted on the shaft 14, which lever swings into the position shown in dot-and-dash lines when the latch plate 82 is released, the stop 110 striking a portion of the machine frame. As the full swing of the transfer finger 67 and auxiliary resistant 70 is completed, the resilient latch member 65, which remains in contact with the arcuate flange 71 of the finger 67 during its movement, snaps under the lip 72 and locks the shaft 14, and hence the finger 67 and resistant 70, against return to their normal positions. At the same time, the pin 94, projecting from the lever 91, travels along the rightward edge of the finger 56 to cam the bell crank 55 about the pivot 60 so that the latch 54 releases the latch holder 53 on the delivery slide 16 (FIG. 3). The lever 52 is now free to transfer the slide 16 toward line delivery position. As the slide 16 moves leftwardly, the collar 63 inegral with the slide abuts the collar 64 fast to the long sleeve 20, whereupon the long sleeve and the line transfer finger 67 integral therewith slide along the rock shaft 14 toward the first elevator. The transfer finger 67 of course picks up the rear end of the completed line 111, thus confining the line between the finger and the resistant 27, the latter now acting as a left-hand delivery finger, and in this way the completed line is delivered to the first elevator 18.

As the delivery slide 16 moves toward the left, it carries with it the plate 32 fastened thereto as well as the tensioning reel 34 and its associated brake levers 37 and 43 mounted on the plate. Upon initial movement of the slide 16, the roller 46 of the brake lever 37 leaves the notch 51 in the cam plate 50, whereby the lever 37 pivots about the screw stud 41 against the force of the spring 42 and the brake shoe 40 is disengaged from the reel 34. The tensioned spring within the reel 34 is thus free to wind the cord 36 upon the reel and in so doing pull the resistant 27 toward the right. As a result, the line 111, which prevents movement of the resistant toward the right, is clamped tightly between the finger 67 and the resistant 27. As the slide 16 continues to move toward the first elevator, the rollers 46 and 47 leave the cam plate 50, and the spring 42 pulls both brake shoe 40 and 45 into engagement with the reel 34. Application of the brake shoe 45 to the reel 34, as mentioned before, prevents the drawing of more cord 36 from the reel, hence the resistant 27 is locked against leftward movement with respect to the delivery slide 16. Therefore, should the slide be stopped abruptly in waiting line position, as sometimes happens, the resistant 27 will not be separated from the line, so that a loose line with its attendant ill effects is prevented.

It will be noticed in FIGS. 2, 3 and 8 that a lever 122 is pivoted at its upper end to the machine frame by a screw stud 123. The lever is provided with a detent 124 projecting from one edge thereof, intermediate its ends, and the lower end of the lever is formed with two forwardly projecting fingers 125 which accommodate the rock shaft 14 between them. The lever 91 on the short shaft 76 is provided with a notch 98 which is adapted to be engaged by the detent 124 when the short shaft is disposed in normal position, i.e., when the latch 83 is in engagement with the notch in the latch plate 82. A tension spring 126, fastened between the lever 122 and the machine frame, urges the detent 124 toward the lever 91. When the sleeve 22 is in its rightwardmost position (FIG. 2), it abuts the two fingers 125 of the lever 122 and maintains the detent 124 out of engagement with the notch 98. Furthermore, as the sleeve 22 begins to move leftwardly, as a new line is composed against the auxiliary resistant 70, the spring 126 is permitted to draw the lever 122 toward the lever 91 but the detent 124 will not engage the notch 98, since the lever 91 is not in its normal position. However, upon the return of the delivery slide lever 52 rightwardly from delivery position, the short shaft 76 is reset to its normal position before the short sleeve 22 reaches its rightwardmost position. At this time, therefore, the detent 124 enters the notch 98 in the lever 91 and functions as a safety device by maintaining the short shaft 76 in its normal position should the latch 83 and latch plate 82 accidentally be disengaged either manually or by energization of the solenoid 87.

The line delivery finger 67 together with the main resistant 27 deliver the composed line to the first elevator and then return toward the star wheel. During this transfer and return movement, further matrices and spacebands for another line may be composed against the auxiliary resistant 70. The short sleeve 22, which carries the resistant 70, is provided with a spring backed plunger 113 disposed in a housing 114 projecting radially through the sleeve (FIG. 6). The plunger 113 is pressed against the shaft 14 and provides the needed frictional resistance to the leftward movement of the auxiliary resistant along the shaft 14 as the matrices are composed against it. It may be seen, therefore, that the instant a composed line is completed in the assembler and the transfer finger 67 and auxiliary resistant 70 enter the assembler behind the completed line, composition of a new line may commence.

When the completed line is delivered to the first elevator, the plate 32 carried by the delivery slide actuates a switch 115 (FIGS. 1 and 9) which inaugurates the automatic casting cycle of the machine. Thereafter, the delivery slide lever 52 is returned toward its normal position by the usual cam (not shown). Before the lever 52 reaches its rightwardmost position, however, the roller 105 mounted thereon contacts the arm 102 on the lever 100, which arm and lever are disposed in the dot-and-dash position in FIG. 8. The lever 100 is thereby pivoted clockwise into the solid line position, whereby the rod 96 is pulled downwardly and through the lever 95 the short shaft 76 is pivoted back to its normal position against the force of the spring 92. When the shaft 76 reaches its normal position, the latch 83 once again engages the notch in the latch plate 82. Although the rock shaft 14 is still locked in its forward position, motion of the shaft 76 is permitted by employment of the slotted link 81.

As the lever 52 and hence the delivery slide 16 continue their rightward travel, the backwardly bent end of the latch member 65 contacts the flange 73 of the auxiliary resistant, and the latch is thereby flexed backwardly and out of engagement with the lip 72 on the transfer finger 67. The spring 75 is then free to rotate the rock shaft 14 and hence the delivery finger 67 and auxiliary resistant 70 back to their normal positions. Previous to this, the roller 46 of the brake lever 37 engages the cam plate 50, thus pivoting the lever 37 and disengaging the brake shoe 40 from the reel 34. The reel is therefore free to pull the resistant 27 into contact with the delivery finger 67 just before the delivery finger and auxiliary resistant are swung out of the assembler. The main resistant 27 is then in position to take over from the auxiliary resistant 70 and continue the support of the line which has been partially composed against the auxiliary resistant until composition of that line is complete, whereupon the solenoid 87 is once again energized.

The delivery slide 16 continues to travel rightwardly until the latch holder 53 mounted thereon engages and is locked by the latch 54. Thereafter, the line delivery finger 67 and auxiliary resistant 70 are moved rightward by the engagement of the collar 63 on the slide 16 with the finger 67 on the long sleeve 24. In their rightmost position, the finger 67 and resistant 70 stand to the right of the center-line of an abutment pin 116, which pin is cut and broken away along its vertical center line to provide a contact face against which the left side of the finger 67 can abut. Note that the pin 116 (FIG. 2) is located directly above the star wheel 13 in order to insure that when the finger 67 and auxiliary resistant 70 are released, they swing downwardly behind the last matrix in the completed line. In addition, the finger 67 and resistant 70 are normally spaced from the collar 63, so that when the finger and resistant 70 swing forwardly and strike the star wheel, the star wheel is free to push them into the assembler against the end of the completed line.

It is believed that the operation of the parts will be clear from the foregoing description but some recapitulation may be helpful:

FIG. 2 shows the parts in their normal position of rest ready for the composition of the first line. As the matrices are advanced into the assembler 12 by the rotation of the star wheel 13, the main line resistant 27 will yield to the left against the tension of the spring reel 34, being held against retrograde movement by the brake lever 37. When the composition of the line has been completed, the line delivery member or transfer finger 67 and the auxiliary line resistant 70 (which as shown in FIG. 2 are arranged side by side in face contact above the star wheel) are rocked downwardly into a position behind the last composed matrix by the more powerful spring 92 which is brought into play by tripping the latch 83 either manually or automatically. As the finger 67 and resistant 70 arrive in their downwardly rocked position, the latch 54 is tripped to release the slide 16 and allow it to move to the left for its line delivery stroke. In this line delivery stroke, the slide 16 (through the engagement of the collar 63 thereon with the collar 64 on the long sleeve 20) picks up the transfer finger 67 which pushes the composed line ahead of it, through the intermediate channel 19 into the first elevator 18, which latter at that time occupies its line receiving position. During such line transfer movement, the brake lever 37 releases the spring reel 34 and allows it (by rotating counterclockwise) to apply the full tension of its spring on the main line resistant 27 so as thus to clamp the composed line firmly between the line resistant and the transfer finger. When the slide 16 arrives in its slide delivery position, it activates the switch 115 and inaugurates the casting cycle, causing the first elevator to carry the composed line downwardly from between the line resistant 27 and the transfer finger 67 and present it to the mold. At that time, both brake levers 37 and 43 are active (their two rollers 46 and 47 having passed beyond the overlying cam plate 50) and lock the reel 34 against rotation in either direction, thus maintaining the line resistant in fixed spaced relation to the line transfer finger.

At the very start of the line delivery movement of the slide 16, that is to say, when the transfer finger is picked up by the slide, the auxiliary line resistant 70 remains behind and acts to support the leading end of the next succeeding line being composed. FIG. 3 shows the preceding line in course of transfer and the next succeeding line in course of composition. The spring plunger 113 provides the necessary resistance to the leftward movement of the auxiliary resistant as the matrices are advanced into the assembler by the star wheel 13. During the return movement of the line delivery slide 16, the two brake levers 37 and 43 are caused (by the reengagement of their respective rollers 46 and 47 with the overlying cam plate 50) to release the spring reel 34, thus permitting the main line resistant 27 to be drawn toward the right until it contacts the transfer finger 67, which latter itself is being returned to the right by the engagement therewith of the collar 63 on the slide 16. As the return movement of the slide 16 continues, and before the transfer finger contacts the auxiliary line resistant 70 which is still giving support to the succeeding line composed or being composed, the latch 65 is tripped to permit both the transfer finger and auxiliary line resistant to be rocked upwardly clear of the newly composed line by the weaker spring 75 through the medium of the rock shaft 14. The stronger spring 92 offers no opposition, since the short shaft 76 (through its connections with the line delivery slide operating lever 52) has been rotated back to its original position and held in that position by the latch 83, which therefore recocks the spring 92 for its next operation. Once the transfer finger and auxiliary line resistant are out of the way, the main line resistant takes over by moving into contact with the newly composed line. When raised clear of the line, both the transfer finger and auxiliary line resistant are restored to their original position as the line delivery slide completes its return movement and is locked in its original starting position by the latch 54. The parts are now ready for the transfer of the newly composed line once the starting latch 83 is again tripped for the next operation.

It will be understood that the operation of the parts will be the same regardless of the time interval between the composition of succeeding lines, the only difference being that the auxiliary line resistant will remain in its rightmost position if the line delivery slide completes its return movement (after transferring a preceding line) before the composition of the next succeeding line begins. Of course, the main advantage of the improved mechanism is that, by the use of the two line resistants, practically continuous composition is possible thus enabling the machine to be operated, either under manual or automatic control, at the highest speed of which it is capable.

The invention is particularly useful when applied to machines operated by an automatic control unit, such as the well known Teletypesetter tape operating unit. In conventional machines equipped with the Teletypesetter unit, the feed of the perforated tape must be interrupted between lines to allow time for the transfer of each composed line. Thus, in effecting such line transer, the assembling elevator must first be raised from line receiving position to line transfer position, then maintained in the latter position until the line has been removed therefrom by the line delivery carriage, and thereafter lowered back to line receiving position. The Teletypesetter unit includes special power operated mechanism for controlling such movements of the assembling elevator. The present invention not only does away with such mechanism, but also permits the tape to be fed continuously through the machine, the end-of-line signal which appears between lines acting to trip the latch 83 in effecting the transfer of the previously composed line.

The invention has been shown and described in preferred form only and by way of example, but many variations and modifications may be made therein and in its mode of application which will still be comprised within its spirit. It is understood, therefore, that the invention is not limited to any specific form or embodiment, except insofar as such limitations are specified in the appended claims.

What is claimed is:

1. In or for a typographical composing machine, mechanism for assembling lines of matrices and transferring them to a delivery position, said mechanism comprising a first line resistant arranged to move with and support the leading end of a line during composition thereof, a second line resistant adapted to move with and support the leading end of a succeeding line during composition thereof while the preceding completed line is being transferred, a line delivery member mounted independently of both line resistants and adapted to engage the rear end of each composed line, and means for actuating said line delivery member after the composition of each line to effect the transfer of said line to delivery position.

2. A matrix assembling mechanism in accordance with claim 1 including means for maintaining said delivery member and said second resistant out of the path of the matrices as they are assembled in said preceding line.

3. A matrix assembling mechanism in accordance with claim 2 including means for shifting said delivery member and said second resistant into the path of the matrices after said preceding line has been assembled.

4. In or for a typographical composing machine, mechanism for assembling lines of matrices and transferring them to a delivery position, said mechanism comprising a stationary assembler, a stacking device for composing matrices in the assembler, a first line resistant normally disposed in said assembler and arranged to move with and support the leading end of a line of matrices being composed in said assembler, a line delivery member normally disposed outside said assembler but movable thereinto behind a composed line after composition of the latter has been completed, whereby the completed line is confined between said first resistant and said delivery member, means for actuating said line delivery member to effect delivery of the completed line, and a second line resistant normally disposed outside said assembler but movable thereinto behind said delivery member when a line has been completed, said second resistant remaining in said assembler to move with and support the leading end of a succeeding line of matrices being composed during the transfer to delivery position of the preceding completed line.

5. A matrix assembling mechanism in accordance with claim 4 including latch means for maintaining said delivery member and said second resistant outside said assembler, and means for releasing said latch upon completion of composition of said preceding line in said assembler.

6. A matrix assembling mechanism in accordance with claim 5, wherein said latch releasing means includes a solenoid.

7. In or for a typographical composing machine, mechanism for assembling a line of matrices and transferring them to a delivery position, said mechanism comprising a stationary assembler, a stacking device for composing matrices in the assembler, a first line resistant normally disposed in said assembler and arranged to move with and support the leading end of a line being composed in said assembler, a line delivery member normally disposed outside said assembler, a second line resistant normally disposed outside said assembler, means for shifting said member and said second resistant into said assembler behind a composed line after composition of the latter has been completed, whereby the completed line is confined between said first resistant and said delivery member, and means for actuating said line delivery member to effect delivery of the completed line, said second resistant remaining in the assembler to move with and support the leading end of a succeeding line being composed during the transfer to delivery position of the preceding completed line.

8. A matrix assembling mechanism in accordance with claim 7 wherein said shifting means includes a primary rotatable shaft and wherein said delivery member and second resistant are rotatable with said shaft and slidable thereon.

9. A matrix assembling mechanism in accordance with claim 8 wherein said shifting means also include a secondary rotatable shaft parallel to said primary shaft, link means connecting said shafts, first spring means tending to rotate said primary shaft in order to maintain said delivery member and second resistant in normal position outside of the assembler, second spring means tending to rotate said secondary shaft in order to shift said delivery member and second resistant into said assembler, said second spring means being stronger than said first spring means, first latch means normally locking said secondary shaft against such rotation, and means for releasing said latch means upon completion of a line in said assembler.

10. A matrix assembling mechanism in accordance with claim 9 wherein said shifting means also include auxiliary latch means for locking said primary shaft against rotation by said first spring means when said second line resistant is within the assembler.

11. A matrix assembling mechanism in accordance with claim 9 wherein said shifting means also include second latch means for locking said line delivery member against translation toward line delivery position, and means responsive to rotation of said secondary shaft for releasing said second latch means.

12. A matrix assembling mechanism in accordance with claim 10 including means operable by said line delivery actuating means to rotate said secondary shaft against the action of said second spring means, thereby recocking said first latch means.

13. A matrix assembling mechanism in accordance with claim 12 including safety means for locking said line delivery actuating means while said first latch means remains recocked.

14. A matrix assembling mechanism in accordance with claim 12 including third latch means for locking said primary rotatable shaft so as to maintain said delivery member and second line resistant in shifted position after said secondary shaft has been rotated to recock said first latch means, and means operable upon return movement of said first resistant and delivery member from line delivery position to the assembler to release said third latch means whereby said first spring means will be permitted to rotate said primary shaft in order to restore said delivery member and second resistant to normal or out-of-assembler position.

15. In a typographical composing machine, mechanism for assembling line of matrices and transferring the lines to a delivery position, said mechanism comprising a stationary assembler, a stacking device for composing matrices in the assembler, a line resistant normally disposed in said assembler and arranged to move with and support the leading end of a line being composed in said assembler, a tensioning unit normally urging said line resistant toward the matrix receiving end of said assembler, said unit having a first brake adapted to resist the action of said unit during composition of a line of matrices aagainst said resistant and a second brake for preventing said resistant from moving out of contact with the leading matrix of a line during transfer of that line to delivery position, a line delivery member normally disposed outside said assembler but movable thereinto behind a composed line after composition of the latter has been completed, and means for automatically releasing said first brake upon initial movement of said line transfer member toward line delivery position whereby said tensioning unit will act to clamp the line tightly between said line resistant and said delivery member, said automatic means serving to release said second brake during composition of a line against said resistant.

16. A matrix assembling mechanism in accordance with claim 15 including means for manually releasing said first brake while said line resistant is disposed in said assembler.

17. In a tape operated typographical composing machine, mechanism for continuously assembling lines of matrices and transferring them to delivery position, said mechanism comprising a stationary assembler, a stacking device for composing matrices in the assembler, a first line resistant normally disposed in said assembler and arranged to move with and support the leading end of a line being composed in said assembler, a line delivery member normally disposed outside said assembler, a second line resistant normally disposed outside said assembler, means responsive to an end-of-line signal in the tape for shifting said delivery member and said second resistant into said assembler behind a composed line after composition of the latter has been completed, and means responsive to the same signal in the tape for actuating said line delivery member to effect delivery of the completed line, said second resistant being adapted to move with and support the leading end of a succeeding line being composed during the transfer to delivery position of the prior completed line, whereby a matrix releasing signal may be placed in the tape following the end-of-line signal in order to immediately commence assembly of a new line after completion of a preceding line.

18. A matrix assembling mechanism according to claim 7, including means for returning the line delivery member to its original out-of-assembler position after the transfer of the preceding line has been completed.

19. A matrix assembling mechanism according to claim 7, including means for returning the second line resistant to its original out-of-assembler position after the transfer of the preceding line has been completed.

20. A matrix assembling mechanism according to claim 7, including common means for returning the line delivery member and the second line resistant to their original out-of-assembler positions after the transfer of the preceding line has been completed.

21. A matrix assembling mechanism according to claim 7, including means for returning the first line resistant to its original starting position after the transfer of the preceding line has been completed in the event that the composition of the succeeding line has not commenced before such return is effected.

22. A matrix assembling mechanism according to claim 7, including means for moving the first line resistant by a return movement into contacting relation to the leading end of the succeeding line and thereafter allowing it to be advanced by the line during composition or during transfer.

23. A matrix assembling mechanism according to claim 18, wherein the line delivery member is moved out of the assembler clear of said line before it reaches its original position.

24. A matrix assembling mechanism according to claim 19, wherein the second line resistant is moved out of the assembler clear of the succeeding line before its return to its original position.

25. A matrix assembling mechanism according to claim 7, including means for returning the line delivery member and the second line resistant to their original out-of-assembler positions after the transfer of the preceding line has been completed, characterized in that said member and said resistant are moved conjointly out of the assembler clear of the succeeding line before they reach their original positions.

26. A matrix assembling mechanism according to claim 25, including means for moving the first line resistant by a return movement into contact with the line delivery member before the latter and the second line resistant are moved out of the assembler and then permitting the first line resistant to be advanced by the succeeding line during composition and transfer thereof.

27. In or for a typographical composing machine, mechanism for assembling a line of matrices and transferring them to a delivery position, said mechanism comprising a line delivery slide movable from a line receiving position to a line delivery position and return, a line resistant arranged to move with and support the leading end of a line being composed in the assembler, said resistant being mounted independently of but movable with the line delivery slide during transfer of the composed line, and a spring tensioning device mounted on the delivery slide and connected to the line resistant, said tensioning device permitting the resistant to yield without retrograde movement during line composition and acting to hold the resistant under tension against the composed line during transfer.

28. A matrix assembling mechanism in accordance with claim 27, wherein the spring tensioning device includes two brakes, also mounted on the delivery slide, one acting to prevent retrograde movement of the line resistant during line composition, and the other to prevent forward or advance movement of the line resistant with respect to the delivery slide during line transfer.

29. In or for a typographical composing machine, mechanism for assembling a line of matrices and transferring them to a delivery position, said mechanism comprising a line delivery slide movable from a line receiving position to a line delivery position and return, a line transfer finger mounted independently of but movable with the line delivery slide in both directions, a rotatable sleeve to which said finger is fixed and by which it is moved into and out of line transfer position, and means for effecting the rotary movement of the sleeve in proper sequence to the movements of the line delivery slide.

30. A matrix assembling mechanism according to claim 29, wherein the sleeve rotating means include two springs, one for maintaining the transfer finger in its non-transfer position when the delivery slide is at rest and for returning the finger to such non-transfer position upon the return stroke of the slide, and the other spring, a stronger spring, for moving the transfer finger into transfer position before the active stroke of the delivery slide, and means for controlling the action of said springs in proper sequence.

References Cited in the file of this patent
FOREIGN PATENTS 812,590    Great Britain ___________ Apr. 29, 1959